United States Patent [19]

Kitade

[11] Patent Number: 4,708,227
[45] Date of Patent: Nov. 24, 1987

[54] SYSTEM FOR CONTROLLING A TRANSFER CLUTCH OF A FOUR-WHEEL DRIVE VEHICLE

[75] Inventor: Nobumitsu Kitade, Tokyo, Japan

[73] Assignee: Fuji Jukogyo Kabushiki Kaisha, Tokyo, Japan

[21] Appl. No.: 855,988

[22] Filed: Apr. 24, 1986

[30] Foreign Application Priority Data

Apr. 30, 1985 [JP] Japan .................................. 60-92979

[51] Int. Cl.$^4$ ............................................. B60K 41/28
[52] U.S. Cl. .............................. 192/0.055; 192/0.032; 192/103 R
[58] Field of Search ................ 192/0.032, 0.033, 0.034, 192/0.076, 0.094, 0.075, 0.055, 103 R; 180/247, 249; 74/710, 711

[56] References Cited

U.S. PATENT DOCUMENTS 4,538,700  9/1985  Suzuki ............................. 180/249 X
4,582,159  4/1986  Suzuki ............................. 180/247
4,586,583  5/1986  Yamakawa et al. ................ 180/247

FOREIGN PATENT DOCUMENTS 59-53128  9/1982  Japan .

Primary Examiner—George H. Krizmanich
Attorney, Agent, or Firm—Martin A. Farber

[57] ABSTRACT

A four-wheel drive vehicle has an engine clutch for transmitting the output of an engine to a transmission, main drive wheels operatively connected to an output shaft of the transmission, auxiliary drive wheels, and a transfer clutch for transmitting the output of the transmission to the auxiliary drive wheels. A control system is provided with a calculator for producing a deceleration signal representing deceleration of the vehicle. A control unit is provided to respond to the deceleration signal for controlling the torque capacity of the transfer clutch so as to increase the torque capacity with increase of the deceleration.

17 Claims, 15 Drawing Figures

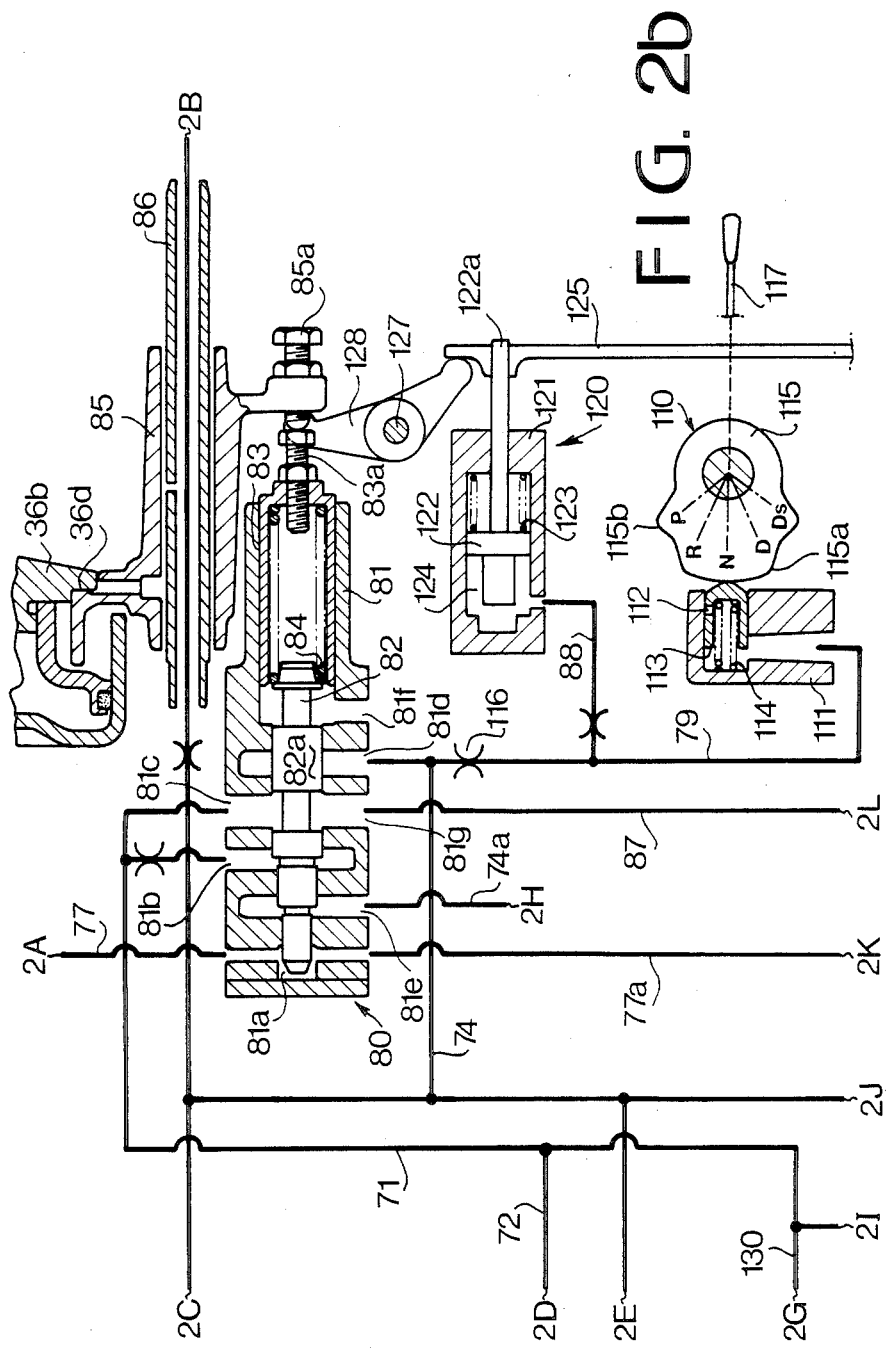

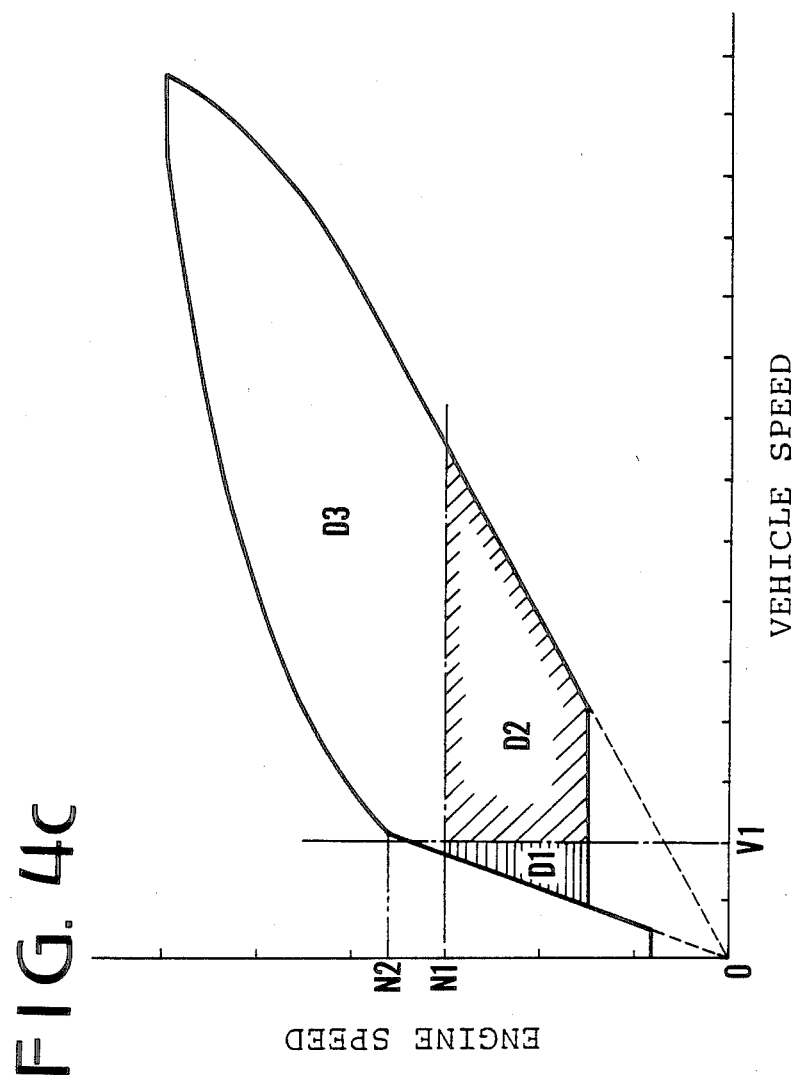

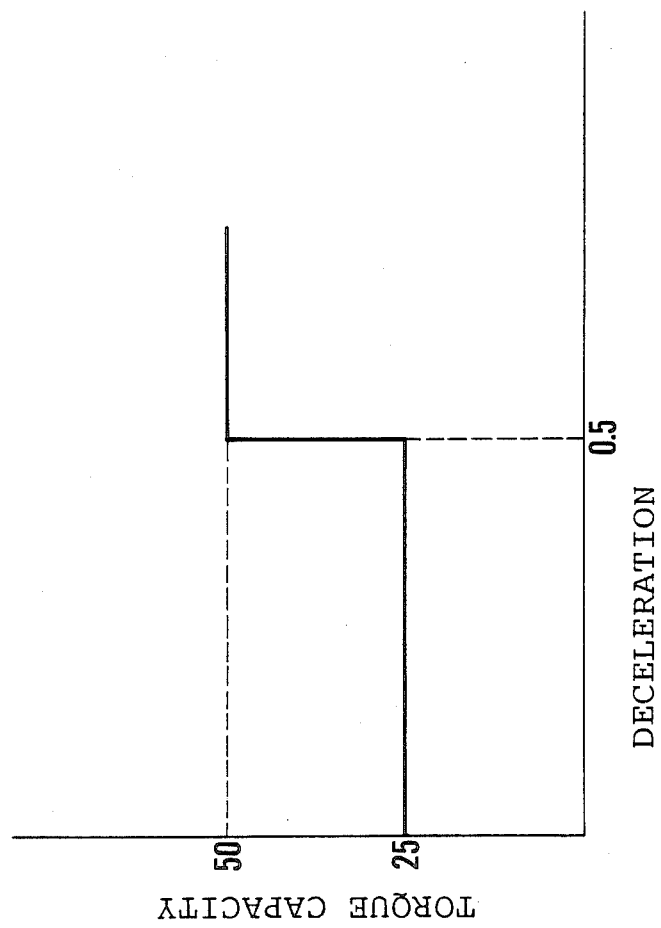

4,708,227

SYSTEM FOR CONTROLLING A TRANSFER CLUTCH OF A FOUR-WHEEL DRIVE VEHICLE

BACKGROUND OF THE INVENTION

The present invention relates to a control system for four-wheel drive vehicles, and more particularly to a system for controlling the torque capacity of a transfer clutch for four-wheel drive vehicles during braking of the vehicle.

A four-wheel drive vehicle of the type in which a transfer clutch is provided for transmitting the output torque of a transmission to auxiliary drive wheels is known. In such a vehicle, a power transmission train can be converted from a two-wheel drive system to a four-wheel drive system by engaging the transfer clutch. In such a vehicle, when the vehicle negotiates sharp corners, braking phenomenon called "tight corner braking" occurs. In order to eliminate the braking phenomenon, a four-wheel drive vehicle, in which a four-wheel drive power transmission train is converted to a two-wheel drive power transmission train at a sharp corner has been proposed. However, although such a system prevents the tight corner braking at sharp corners by the two-wheel drive vehicle system, characteristics of the four-wheel drive vehicle such as its driveability on slippery roads, uphill driving and other conditions are not effected.

In order to prevent the tight corner braking with while keeping a four-wheel drive power train, it is preferable to employ a friction clutch as a transfer clutch and to control the torque capacity of the transfer clutch so as to let the clutch slip in accordance with driving conditions of the vehicle.

On the other hand, it is preferable to establish the four-wheel drive at the braking of the vehicle. Japanese Utility Model Laid Open No. 59-53128 discloses a four-wheel drive vehicle having a transfer clutch, in which the transfer clutch is engaged to provide the four-wheel drive, when the depression force exerted on a brake pedal of a vehicle exceeds a predetermined value. However, the system has a disadvantage that the four-wheel drive is not established when the depression force is small.

Considering the braking effect in a four-wheel drive vehicle having a friction transfer clutch, when the vehicle is suddenly braked, the auxiliary wheels tend to be locked with slipping of the transfer clutch if the torque capacity of it is set to a small value. The locked auxiliary wheels skid, which will decrease the braking effect of the vehicle. In order to eliminate such a disadvantage, it is preferable to increase the torque capacity of the transfer clutch so as to transmit the torque of the engine to the auxiliary wheels when the depression force on the brake pedal is large.

To the contrary, when the vehicle turns sharp corners, the depression force may be small. Accordingly, at a small depression force, it is desirable to decrease the torque capacity in order to prevent the tight corner braking.

SUMMARY OF THE INVENTION

The object of the present invention is to provide a system which controls the torque capacity of a transfer clutch in accordance with deceleration of a vehicle, thereby improving the braking effect at sudden braking and preventing the tight corner braking at sharp corners.

The other objects and features of this invention will become understood from the following description with reference to the accompanying drawings.

BRIEF DESCRIPTION OF DRAWINGS

FIGS. 2a to 2c show a hydraulic control circuit according to the present invention;

FIG. 4c shows a relationship between vehicle speed and engine speed;

FIG. 4d shows a relationship between deceleration and torque capacity; and

DETAILED DESCRIPTION OF THE PREFERRED EMBODIMENT

Figure 1A:
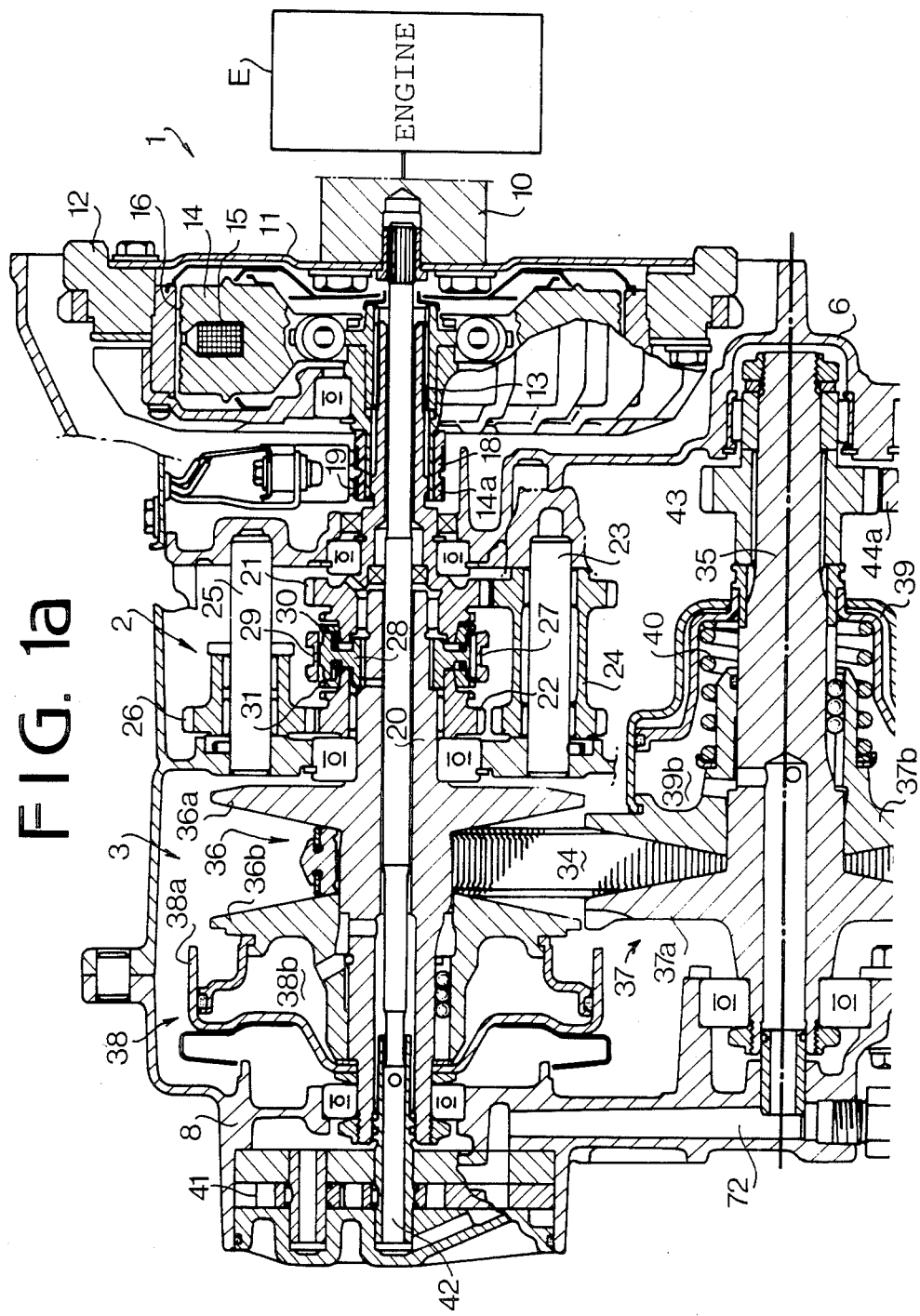
FIGS. 1a to 1c show a sectional view of an infinitely variable belt-drive transmission to which the present invention is applied.
Figure 1B:
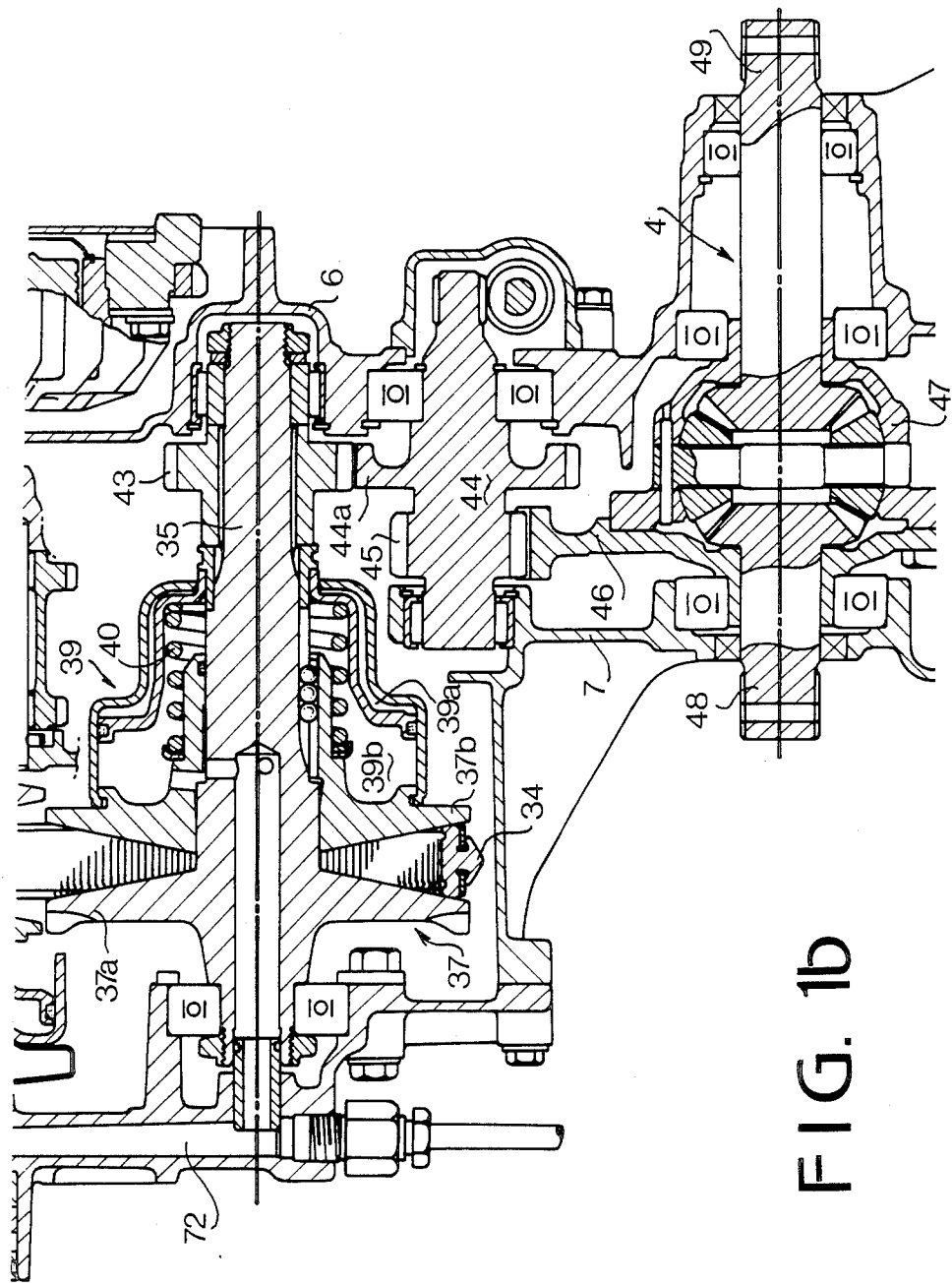
Figure 1C:
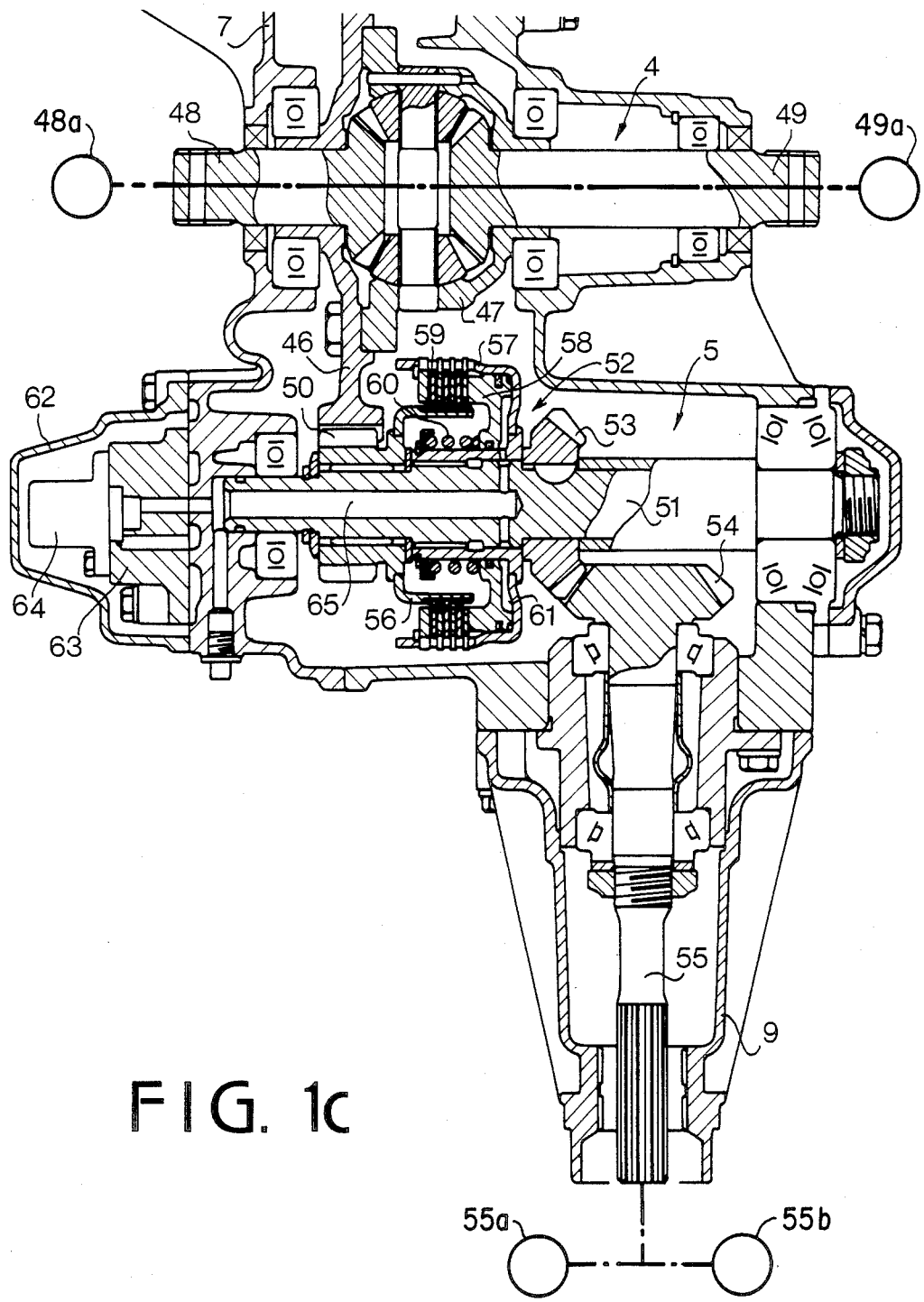

FIGS. 1a to 1c show a four-wheel drive power transmission system with an infinitely variable belt-drive automatic transmission for a motor vehicle, to which the present invention is applied. An engine E is transversely mounted on a motor vehicle at a front portion thereof. The power transmission system comprises an electromagnetic powder clutch 1 (main clutch), a selector device 2, an infinitely variable belt-drive transmission 3, a differential 47 for front wheels, and a transfer device 5. The electromagnetic powder clutch 1 is provided in a housing 6. The selector device 2, transmission 3, final reduction device 4 and transfer device 5 are provided in a main housing 7 and a side housing 8. An extension case 9 is secured to the main housing 7. A crankshaft 10 of the engine E is connected to an annular drive member 12 through a drive plate 11 of the electromagnetic powder clutch 1. The electromagnetic powder clutch 1 comprises a driven member 14, and a magnetizing coil 15 provided in the driven member 14. The driven member 14 has its outer periphery spaced from the inner periphery of the drive member 12 by a gap 16. Magnetic power material is provided in the gap 16. The driven member 14 is secured to an input shaft 13 of the belt-drive transmission. A holder secured to the driven member 14 carries slip rings 18 which are electrically connected to the coil 15. The coil 15 is supplied through brushes 19 and the slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 2 is provided between the input shaft 13 and a main shaft 20. The main shaft 20 is cylindrical and is disposed coaxially with the input shaft 13. The selector device 2 comprises a drive gear 21 integral with the input shaft 13, reverse driven gear 22 rotatably mounted on the main shaft 20, and a synchronizer 27 mounted on the main shaft 20. The drive gear 21 meshes with one counter gear 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through the rings 30 or 31.

At a neutral position (N range) or a parking position (P range) of a selector lever (not shown), the sleeve 29 does not engage either gear, so tht the main shaft 20 is disconnected from the input shaft 13. When the sleeve 29 is engaged with the gear 21, the input shaft 13 is connected to the main shaft 20 through the gear 21 and synchronizer 27 to provide a drive range position (D, Ds ranges). When the sleeve 29 is engaged with the gear 22, the input shaft 13 is connected to the main shaft 20 through the gears 21, 24, 26 and 22 to provide a reverse drive range position (R range).

The main shaft 20 has an axial passage in which an oil pump driving shaft 42 connected to crankshaft 10 is mounted. In the transmission 3, an output shaft 35 is provided in parallel with the main shaft 20. A drive pulley 36 and a driven pulley 37 are mounted on shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder 38a secured to the main shaft 20 to form a servo device 38 having a chamber 38b.

A fixed conical disc 37a of the driven pulley 37 is formed on the output shaft 35 opposite the movable disc 36b and a movable conical disc 37b is slidably mounted on the shaft 35 opposite disc 36a. The movable conical disc 37b also slides in a cylinder 39a secured to the output shaft 35 to form a servo device 39. A chamber 39b of the servo device 39 is communicated with the oil pump 41 through a passage 72. A spring 40 is provided to urge the movable conical disc 37b to the fixed conical disc 37a. A drive belt 34 engages with the drive pulley 36 and the driven pulley 37. The movable disc 36b has an area exposed to the line pressure which is larger than the corresponding area of the movable disc 37b.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of main, front driving wheels 48a, 49a of the vehicle through a differential 47.

The transfer device 5 comprises a transfer gear 50 engaged with the final gear 46 and rotatably mounted on a transfer shaft 51 which is transversely disposed and rotatably supported by bearings and a transfer clutch 52 in the form of a fluid operated multiple-disk friction clutch. The transfer clutch 52 comprises a hub 56 secured to the transfer gear 50, cylinder 57 secured to the shaft 51, a plurality of disks 59 provided between the hub 56 and the cylinder, and piston 58 for engaging the disks 59 with each other and piston chamber 61. A spring 60 is provided to urge the piston 58 to disengage the disks 59. Thus, the transfer clutch 52 operates to couple the gear 50 with the shaft 51, so that the rotation of the gear 50 is transferred to auxiliary, rear drive wheels 55a, 55b of the vehicle through shaft 51, bevel gear 53 secured to the shaft, bevel gear 54 engaged with the bevel gear 53 and rear drive shaft 55. The piston chamber 61 communicated through a passage 65 in the shaft 51 with a valve assembly 63 which is provided with a solenoid 64.

Figure 2A:
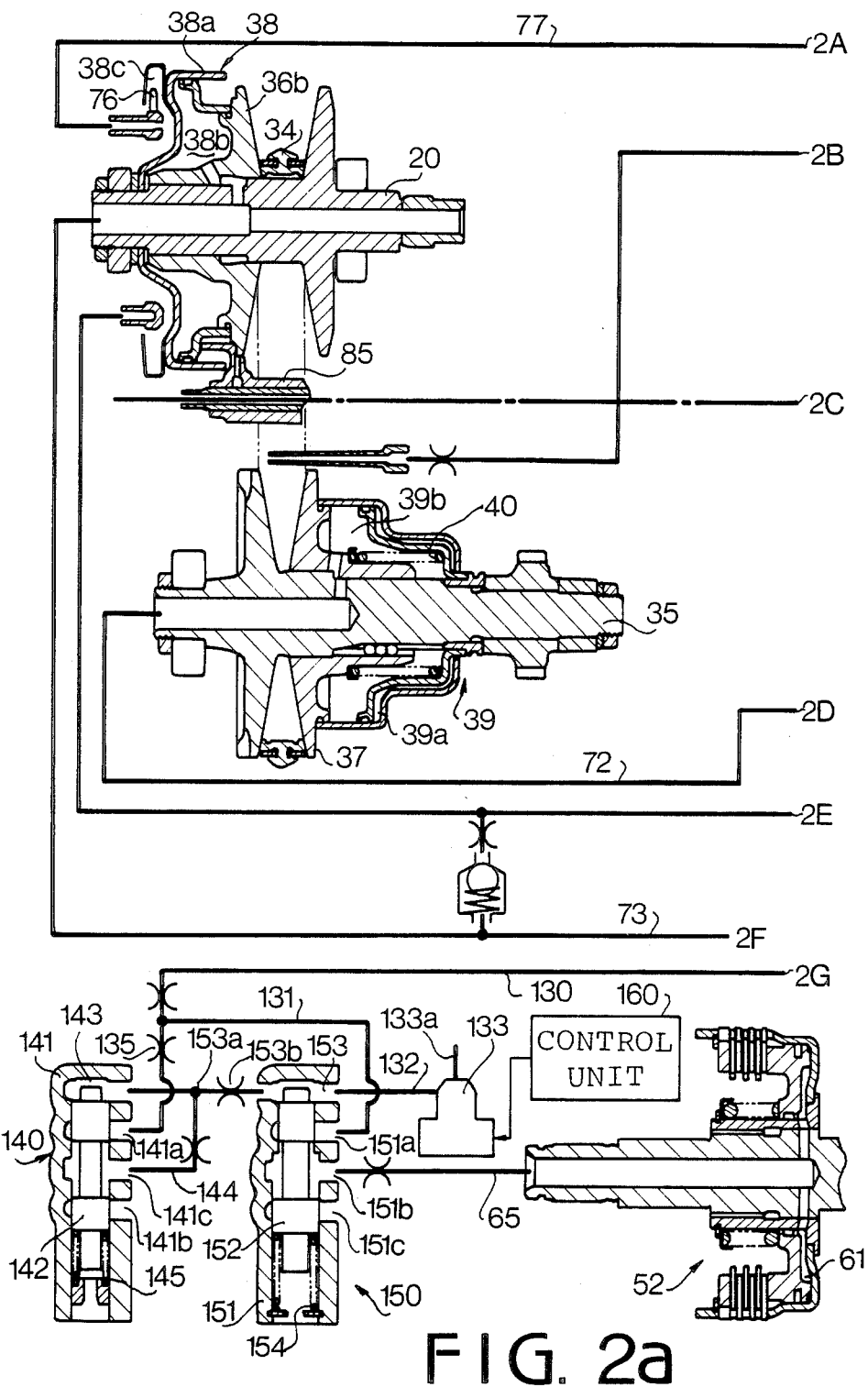
Figure 2C:
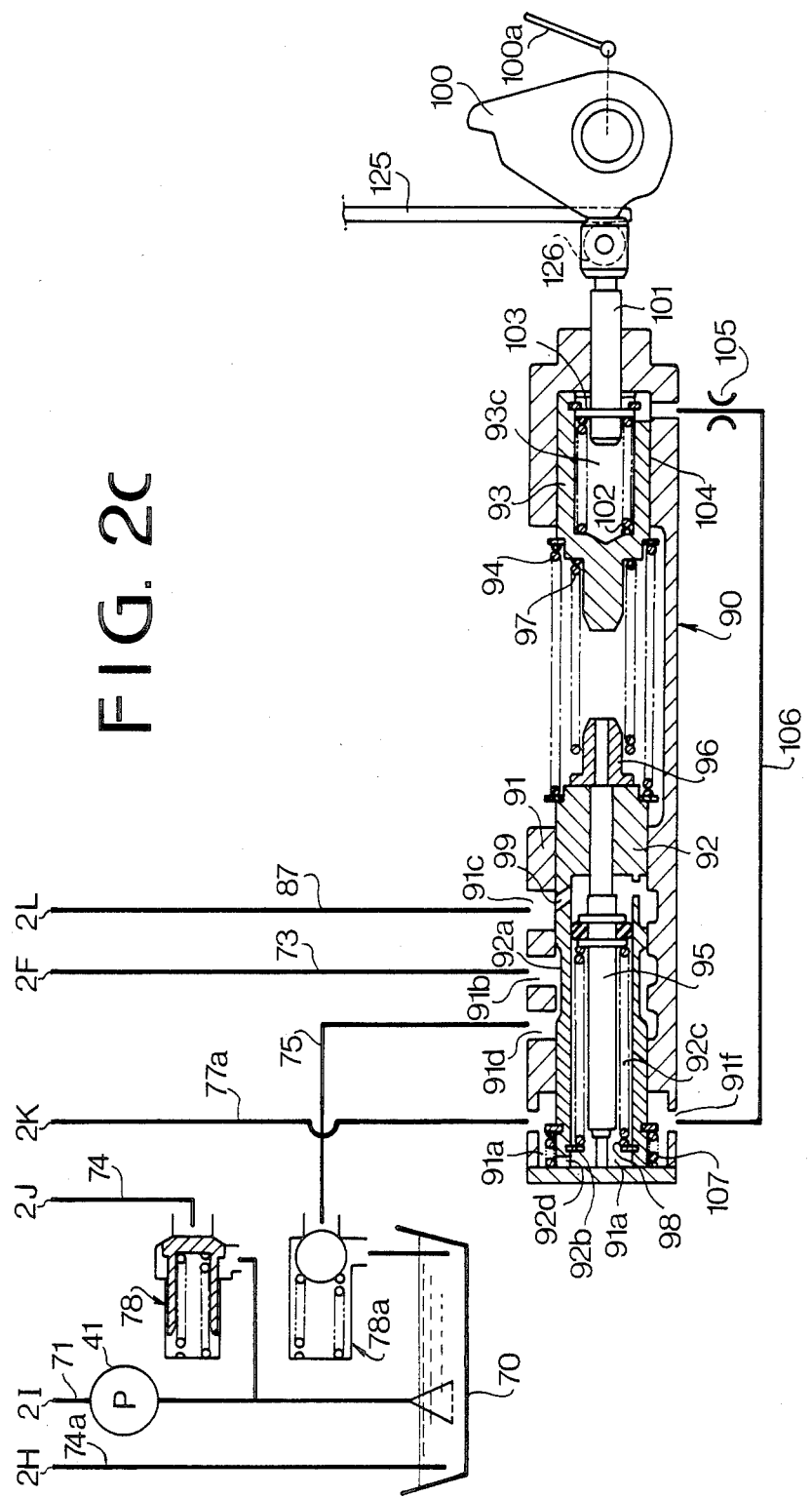

FIGS. 2a to 2c show a hydraulic control circuit according to the present invention. The circuit is provided with a pressure regulator valve 80 and a transmission ratio control valve 90.

The pressure regulator valve 80 comprises a valve body 81, spool 82, and a spring 84 provided between a spring retainer 83 and one end of the spool 82 for urging the spool to the left.

The transmission ratio control valve 90 comprises a valve body 91, spool 92, operating plunger 93, and a spring 94 provided between the spool 92 and the plunger 93. Oil in an oil reservoir 70 is supplied to chamber 81b of the pressure regulator valve 80 through a passage 71 by the pump 41. An oil passage 72 connected to the passage 71 is communicated with the driven pulley servo chamber 39b. The passage 71 is further communicated with the drive pulley servo chamber 38b through ports 81c and 81g of the regulator valve 80, parts 91c and 91b of the transmission ratio control valve 90 and a passage 73. Oil flows back from a port 81d of the regulator valve 80 to the inlet of the pump 41 through drain passages 74 and a check valve 78. A drain port 91d of the transmission ratio control valve 90 is communicated with the oil reservoir 70 through a passage 75 and a check valve 78a.

The drive pulley cylinder 38a has an annular inside groove 38c in which a rotation speed sensor 76 in the form of a pitot tube is provided for measuring the speed of the oil in the groove, that is the speed of the main shaft 20 which is proportional to the engine speed. The pitot pressure produced by the rotation speed sensor 76 is applied to end chambers 81a and 91a of the valves 80 and 90 through passages 77 and 77a.

The part 81a of the pressure regulator valve 80 is communicated with a select position detecting valve 110 upstream of the check valve 78 through a passage 79 and further with an actuator 120 for the transmission ratio control valve 90 through a passage 88.

A sensor shoe 85 for detecting the actual transmission ratio is slidably mounted on a lubricating oil pipe 86 which is parallel with the axis of the spool 82. A bolt 85a secured to an end of the sensor shoe 85 engages with an end of a bolt 83a secured to the spring retainer 83, and the other end of the sensor shoe 85 engages with the outside periphery 36d of the movable disc 36b. Thus, the position of the movable disc 36b which means the transmission ratio during the operation is transmitted to the spool 82 through the spring 84. At the end of the valve body 81, opposite to the spring 84, the pitot pressure is applied to the end chamber 81a, and pump oil pressure is applied to port 81b through the passage 71. A port 81e which is provided between the chamber 81a and the port 81b for preventing the leakage of the oil dependent on the line pressure, is communicated with the oil reservoir 70 through drain passages 74a and 74b. The port 81c is communicated with the port 81d through a chamber formed on a land 82a of the spool 82 when the spool is shifted to the right, so that the line pressure can be regulated.

Thus, the spool 82 is applied with the pitot pressure and pump oil pressure so as to be moved in the direction to open the port 81d, whereas the elastic force of the spring 84 corresponding to the transmission ratio detected by the sensor shoe 85 urges the spool 82 in the direction to close the port 81d. Accordingly, high line pressure is generated at the port 81g at a low engine speed with a large transmission ratio. The sensor shoe 85 is moved to the right in FIG. 2b as the transmission ratio decreases, reducing the force of the spring 84 to lower the line pressure. The line pressure is transmitted to on the belt 34 at a proper force dependent on the transmission ratio so as not to cause the belt to slip on the pulleys.

The transmission ratio control valve 90 further comprises an annular groove 92a formed on the spool 92 so as to communicate the ports 91b with 91c or port 91d for supplying or discharging line pressure to or from the drive pulley servo chamber 38b in dependency on the position of the spool 92. A regulator spring 97 is provided between the operating plunger 93 and a retainer 96 securely mounted on a projecting end of a regulator plunger 95 which is slidably provided in an axial cavity 92c in the spool 92. A spring 98 is provided between a flange of the plunger 95 and a retainer 92b of the spool 92. The force of the regulator spring 97 is determined by the projecting extent of the plunger 95 from the spool 92 and the position of the plunger 95 is dependent on the line pressure at the port 91c which is supplied to the inside of the spool 92 through a small aperture 99.

The plunger 93 is slidably mounted in the valve body 91 and has an axial cavity 93c. A rod 101 is axially slidably mounted in the valve body 91, and a flange 103 of the rod 101 is slidably engaged with the wall of the cavity 93c. A small spring 102 is provided between the flange 103 and the plunger 93. The pitot pressure is applied to the chamber 91a through a port 92d. The cavity 93c is supplied with the pitot pressure through a port 91f and a passage 106 having an orifice 105. A spring 107 is provided between an end of the spool 92 and the valve body 91 to adjust the load on the spring 102. An end of the rod 101 engages with a cam 100 which is operatively connected to an accelerator pedal 100a of the vehicle so as to be rotated in dependency on the depression of the pedal.

When the spool 92 is moved by the pitot pressure to communicate the port 91c with port 91b, the line pressure is applied to the servo chamber 38b of the drive pulley 36 to upshift the transmission. On the other hand, when the port 91b communicates with the port 91d, the chamber 38b is drained to downshift the transmission.

The select position detecting valve 110 comprises a valve body 111, a valve 113 having a drain aperture 112 which is slidably mounted in the valve body 111, a spring 114 for urging the valve 113 against a cam 115 which rotates according to the position of a selector lever 117. The cam 115 has a lobe 115a corresponding to D, N, R range positions, and lobes 115b formed in the both sides of the lobe 115a, corresponding to P and Ds range positions. At the D, N, R range positions, the lobe 115a pushes the valve 113 in the direction to close the drain aperture 112, so that actuating oil pressure is built up. At the P and Ds range positions, the valve 113 moves outwardly to open the drain aperture 112, so that the oil pressure in the passages 74 and 79 is lowered. At that time the oil pressure decreases gradually, because of an orifice 116 provided in the oil passage 79. The oil pressure is applied to the actuator 120.

The actuator 120 comprises a cylinder 121, a piston 122 which is slidably mounted in the cylinder 121, and a spring 123 for urging the piston 122 in a direction toward a piston chamber 124 to which actuating oil pressure is applied through a passage 88. Further, a connecting rod 125 is secured to an outer end of a rod 122a of the piston 122 and is engageable with a pin 126 on the rod 101 of the transmission ratio control valve 90. At the P range or Ds range, since no actuating oil pressure exists, piston 122 presses the rod 101 to the left in FIG. 2c, controlling the transmission zone to the side of high engine revolution. Thus, the releasing of the accelerator pedal at the Ds range causes the downshift of the transmission, so that engine braking effects. Further, a correction lever 128 rotatably supported by a pin 127 is provided between the sensor shoe 85 and the rod 125, in order to correct the characteristics in the Ds range. One end of the lever 128 engages with the rod 125 only when the piston 122 of the actuator 120 moves to the left. Under such a condition, when the transmission is downshifted to shift the disk 36b to the left, the sensor shoe 85 engages with the end of the lever 128 to rotate it. Thus, the rod 125 and piston 122 are moved toward the right as the transmission ratio increases, and, at the maximum transmission ratio, the piston 122 is returned to the right end position.

A control system for the transfer clutch 52 is explained hereinafter. The control system comprises a pressure regulator valve 140, a transfer control valve 150, a solenoid operated valve 133, and a control unit 160. The pressure regulator valve 140 comprises a valve body 141, spool 142, end chamber 143, spring 145 for urging the spool 142 to the end chamber 143. A port 141a is communicated with the pump 41 through a passage 130 having an orifice 135. The spool 142 is shifted by the difference between forces exerted on both ends thereof, one of which is the pressure of oil in the chamber 143 and the other is the force exerted by the spring 145. When the spool 142 is downwardly shifted, a drain port 141b opens, thereby draining the oil in the chamber 143 through a passage 144 and ports 141c and 141b. When the spool 142 is upwardly shifted, the port 141a opens, so that oil is supplied to the chamber 143 through passage 130, ports 141a and 141c, and passage 144. Thus, the pressure of oil in the chamber 143 is kept constant.

Designating the pressure receiving area of the spool 142 in the chamber 143 by S, the regulator pressure of oil in the chamber 143 by Pr and the force exerted by spring 145 by F, $$Pr \cdot S = F$$

$$Pr = F/S$$

Accordingly, the pressure Pr can be kept constant.

The transfer control valve 150 comprises a valve body 151, a spool 152 having two pistons which are different in diameter, an end chamber 153 communicated with the chamber 143 through a passage 153a having an orifice 153b, a spring 154, a port 151a communicated with the passage 130 through a passage 131, port a 151b communicated with the piston chamber 61 of the transfer clutch 52 through passage 65, and a drain port 151c. The chamber 153 is communicated with the solenoid operated valve 133 through a passage 132 so as to provide control pressure Pc in chamber 153. The control pressure Pc and clutch pressure $P_T$ of oil in the chamber 61 urge the spool 152 downwardly against the spring 154. When the spool 152 moves downwardly, port 151a is closed and drain port 151c is opened, so that the clutch pressure $P_T$ decreases. To the contrary, when the spool 152 is upwardly shifted, port 151a opens to increase the clutch pressure $P_T$.

Thus equation for the control pressure Pc, clutch pressure $P_T$, the force F exerted by the spring 154, the area S1 of the large diameter piston and the area S2 of the small diameter piston of the spool 152, is $$Pc \cdot S2 + P_T(S1 - S2) = F$$

Therefore $$P_T = (F - Pc \cdot S2)/(S1 - S2)$$

Since S1, S2 and F are constant, the clutch pressure $P_T$ is inversely proportional to the control pressure $P_c$. The solenoid operated valve 133 is operated by a pulse train applied from the control unit 160. The control pressure Pc is controlled by changing the duty ratio of the pulses in the pulse train.

Figure 4A:
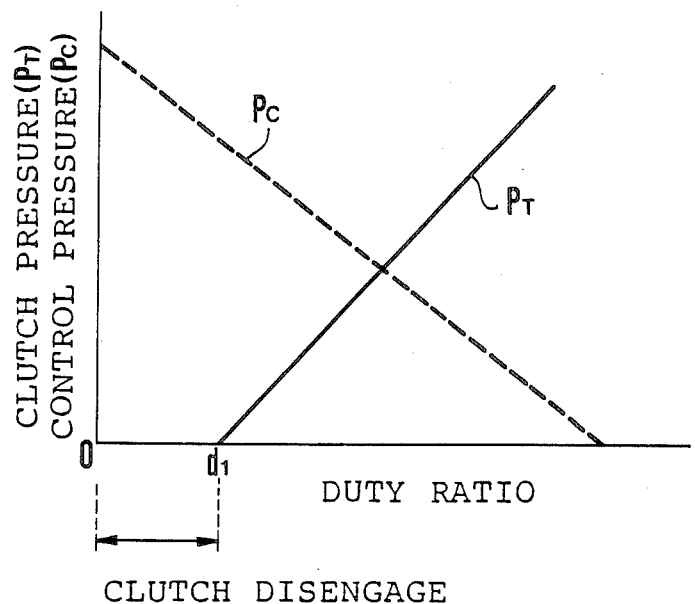
FIG. 4a is a graph showing a relationship between clutch pressure, control pressure and duty ratio.

FIG. 4a shows the relationship between the clutch pressure $P_T$, control pressure Pc and duty ratio. When the duty ratio is at 0%, the solenoid operated valve 133 does not drain the oil in the end chamber through drain passage 133a. Accordingly, the control pressure Pc is at the highest value which is equal to the regulator pressure Pr. As the duty ratio increases, the control pressure Pc reduces as shown by the dashed line. On the other hand, the clutch pressure $P_T$ is zero in a range smaller than a small duty ratio d1 and increases with increasing duty ratio from the duty ratio d1.

Figure 3A:
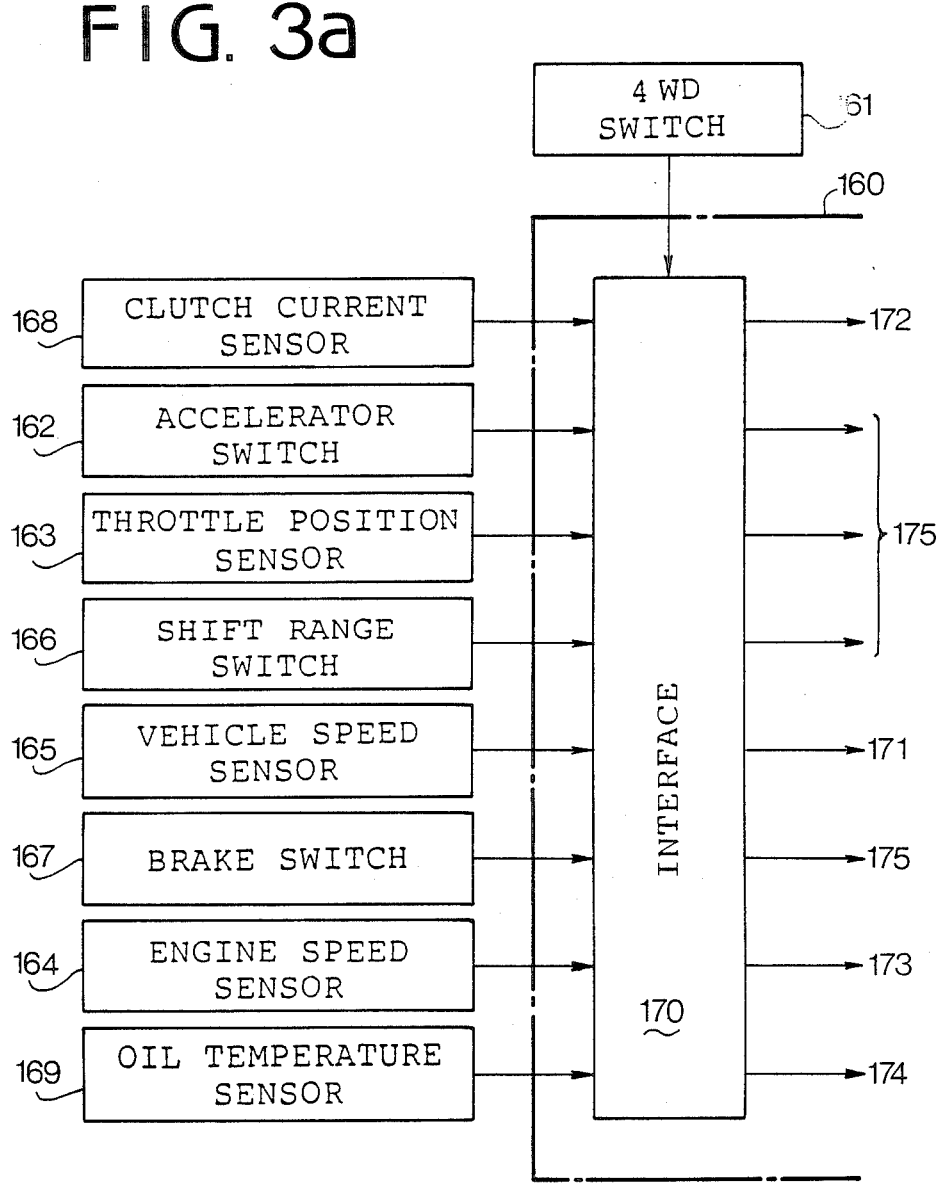
FIGS. 3a to 3c show a block diagram of a control system of the present invention.
Figure 3B:
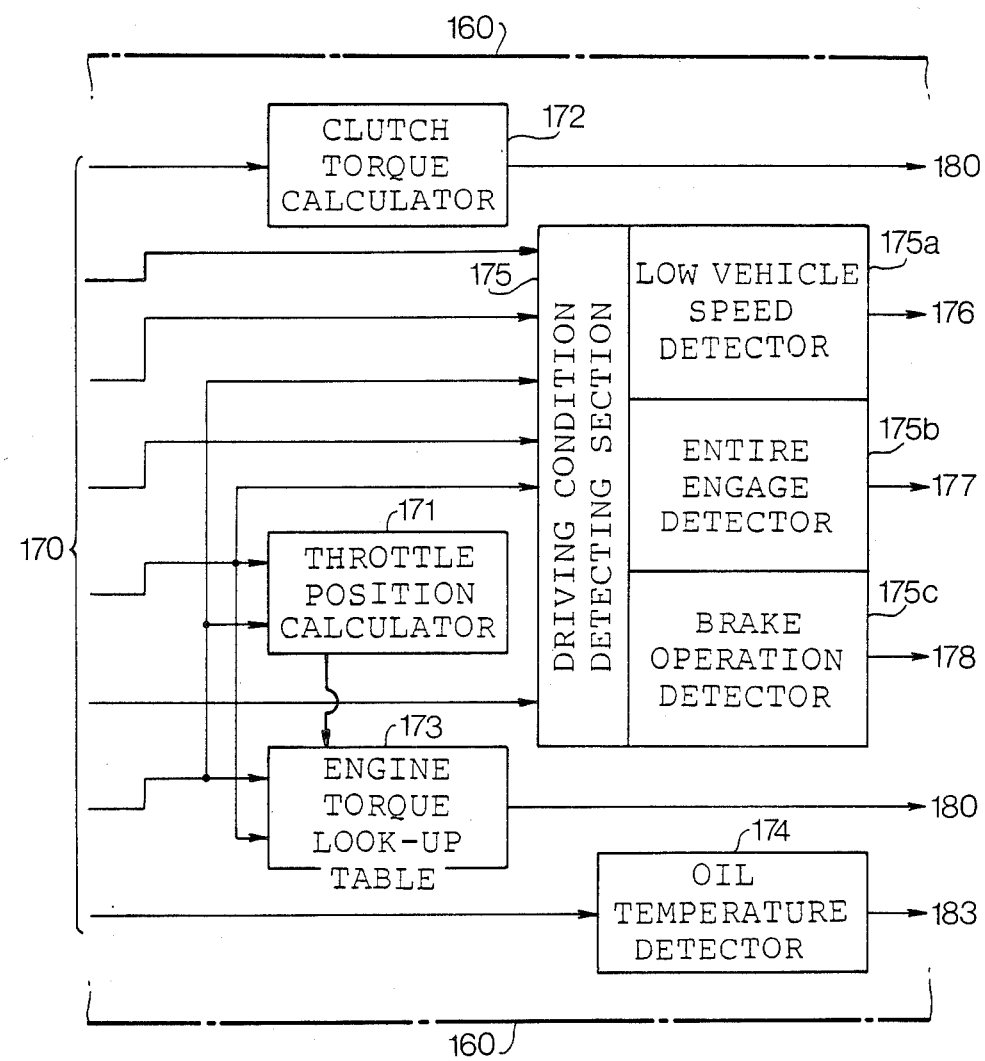
Figure 3C:
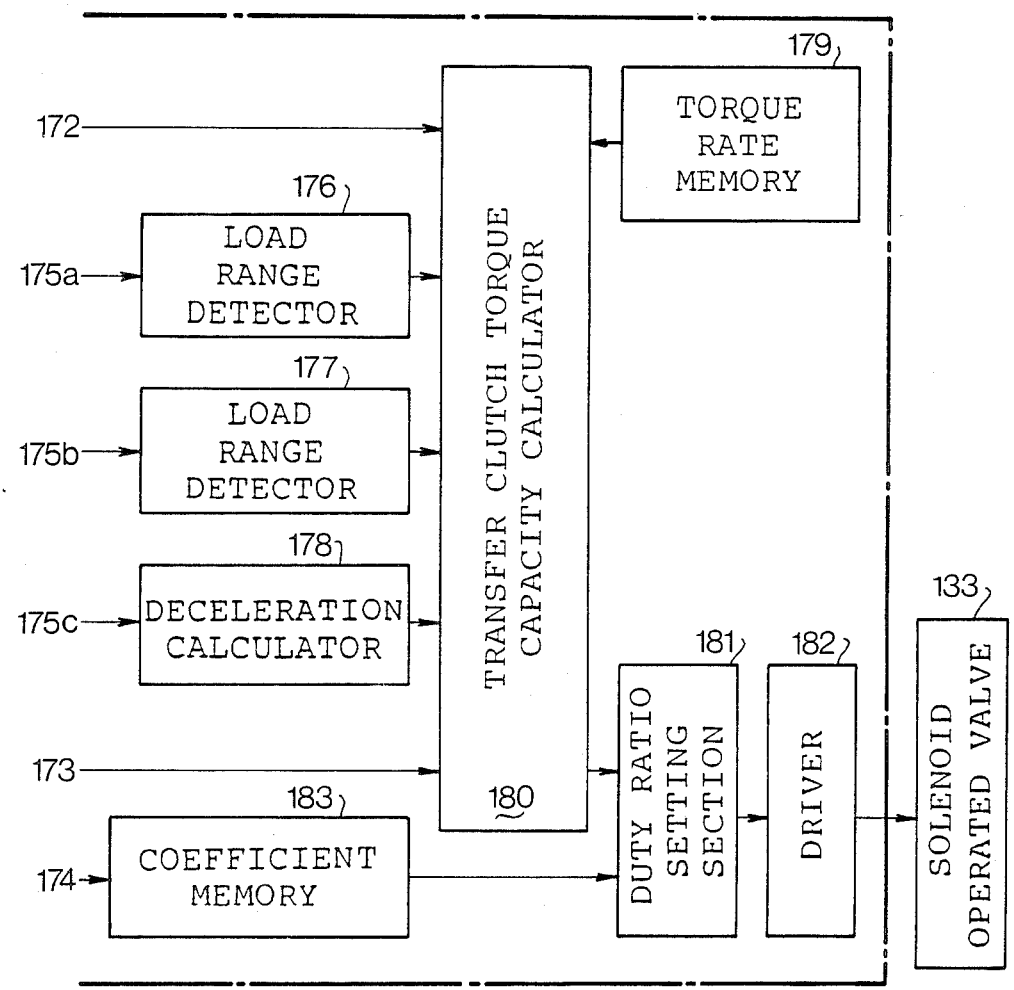

Referring to FIGS. 3a to 3c showing a block diagram of a system according to the present invention, the system has a 4WD switch 161 for detecting the four-wheel drive state, accelerator switch 162 for the detection of the release of the accelerator pedal 100a, throttle position sensor (switch) 163 for detecting whether the engine load is in a light load range or a heavy load range, engine speed sensor 164, vehicle speed sensor 165 for detecting vehicle speed dependent on the speed of the front wheels, shift range switch 166 for detecting D, Ds and R ranges, brake switch 167 for sensing the depression of a brake pedal, clutch current sensor 168 of the clutch 1, and oil temperature sensor 169. When the 4WD switch 161 is closed, output signals of the switches and sensors 162 to 169, 184 and 186 are fed to the control unit 160 through an interface 170.

Figure 4B:
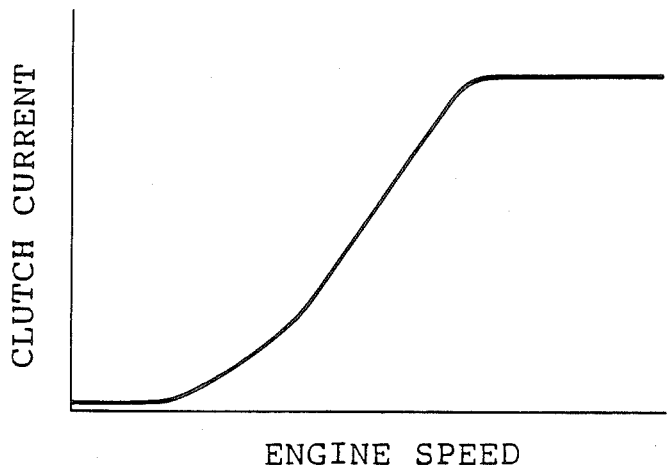
FIG. 4b shows a characteristic of an electromagnetic clutch.

In the control unit 160, a throttle position and transmission ratio calculator 171 calculates the transmission ratio based on engine speed and vehicle speed and the position of a throttle valve of the engine is taken from a look-up table. The relationship between vehicle speed and engine speed of a vehicle having the infinitely variable belt-drive transmission has a pattern in accordance with load as shown in FIG. 4c. Accordingly a look-up table for the throttle valve position can be provided from the graph of FIG. 4c. In a low vehicle speed range $D_1$ lower than a low speed $V_1$, the clutch 1 is in a partial engage state in accordance with small clutch current shown in FIG. 4b. A clutch torque calculator 172 calculates the torque capacity, that is the transmitted torque in the partial engage state of the clutch 1, based on the clutch current. An engine torque look-up table 173 provides engine torque from the throttle position and engine speed, and respectively from vehicle speed when vehicle speed is greater than the speed $V_1$ when the clutch is completely (entirely) engaged. An oil temperature detector 174 detects high temperature higher than a set value.

A driving condition detecting section 175 comprises a low vehicle speed detector 175a for detecting vehicle speed lower than the speed $V_1$, clutch entire engage detector 175b at high speed higher than $V_1$, and brake operation detector 175c. The output signal of the low vehicle speed detector 175a is applied to a load range detector 176 which detects whether the engine is in a light load range (partially open throttle) or a heavy load range (wide open throttle) in accordance with output signals of the accelerator switch 162 and throttle position sensor 163, and further detects the position of the shift lever 117 at each load range in accordance with the output signal of the shift range switch 166. The output signal of the detector 175b is applied to a load range detector 177 which detects a light load range $D_2$ (FIG. 4c) below a predetermined engine speed $N_1$ and a heavy load range $D_3$ above speed $N_1$. The engine speed $N_1$ is set to a speed lower than an engine speed $N_2$ from which the upshifting of the transmission starts. The output signal of the brake operation detector 175c is applied to a deceleration calculator 178 for producing a deceleration signal. The output signal of each section is applied to a transfer clutch torque capacity calculator 180. A clutch torque rate (coefficient) memory 179 supplies torque rates to the torque capacity calculator 180 so as to provide a proper torque capacity.

The following table shows rates each of which is expressed as a percentage with respect to the transmitting torque of the clutch 1 under some conditions and with respect to the engine torque under other conditions. More particularly, under low vehicle speed conditions below a set speed V1 in partial engagement of the clutch 1, the torque capacity of the transfer clutch 52 is determined by a percentage of the transmitting torque of the clutch 1. When the clutch 1 is entirely engaged above the speed V1, the torque capacity of the transfer clutch 52 is determined by a percentage with respect to the engine torque. When the vehicle is braked, one of the torque rates (25%, 50%) is selected in accordance with the deceleration. The torque capacity is obtained by multiplying the torque rate (percentage) and the engine torque together. When the accelerator pedal is depressed to open the accelerator switch 162, the torque capacity is changed in accordance with driving conditions in the table. If the accelerator switch is not operated, the torque capacity at braking is changed after a set period. Further, when the vehicle is braked and the accelerator pedal is thereafter depressed, the torque rate is set to the larger value. For example, when braked at Ds-range at heavy load, the torque rate is set to sixty percent.

TABLE

| | $V < V_1$ | | $V \geq V_1$ | | braking deceleration | |
|---|---|---|---|---|---|---|
| Accelerator Pedal release | light load | heavy load | (engine speed) $N_E < N_1$ | $N_E \geq N_1$ | low | high |
| D | 10% | 25% | 50% | 30% | 50% | 20% | 50% |
| $D_s$ | | 30% | 60% | 30% | 50% | | |
| R | | 20% | 60% | 30% | 50% | | |

A duty ratio setting section 181 produces a duty ratio signal dependent on the output of the torque capacity calculator 80. The duty ratio signal is corrected by a coefficient from a coefficient memory 183 when oil temperature is higher than a set temperature $t_1$. The duty ratio signal is applied to the solenoid operated value 133 through a driver 182.

It has been substantiated by experiments that a maximum torque capacity of the transfer clutch 52 equal to the gripping force of the rear wheels 55a, 55b of the vehicle is sufficient to drive the four-wheel drive vehicle. The maximum percentage (60%) in the table is based on such a fact. A necessary minimum percentage (10%) is for the deceleration at the release of accelerator pedal.

The operation of the system is described hereinafter. While the vehicle is at a stop, the driven pulley servo chamber 39b is supplied with the line pressure adjusted by the pressure regulator valve 80 through the passages 71, 72, and the drive pulley servo chamber 38b is drained, since the spool 92 is at the left end position by the spring 94. Thus, the driving belt 34 engages with the driven pulley 37 at a maximum running diameter to provide the largest transmission ratio (low speed stage).

On the other hand, the selector lever 117 is at the N range position to select the N range, so that the drain aperture 112 of the select position detecting valve 110 is closed. When the D range is selected, the input shaft 13 and the main shaft 20 are connected to each other in the selector device 2 by the selector lever 117. When the acceleration pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to axles of the driving wheels. Thus, the vehicle is started.

When the pitot pressure rises, the spool 92 is shifted to the right, so that the line pressure is applied to the servo chamber 38b to move the disc 36b to the right. Thus, upshifting of the transmission starts.

When the 4WD switch 11 is off, the control unit 160 produce a two-wheel drive signal, so that the duty ratio setting section 181 produces a duty ratio signal for providing pulses of zero percent. Accordingly, the solenoid operated valve 133 is closed, thereby increasing the control pressure $P_c$ in the chamber 153 of the transfer control valve 50 to a maximum value. As a result, the spool 152 is downwardly shifted to close the port 151a, which causes the clutch pressure $P_T$ to become zero to disengage the transfer clutch 52. Thus, two-wheel drive transmission system is established.

When the 4WD switch 161 is closed, signals from switches and sensors are applied to the control unit 160 through the interface 170. At a low vehicle speed below $V_1$, including the starting of the vehicle, the torque capacity of the electromagnetic clutch 1 is calculated at the calculator 172. Thus, the partial engagement of clutch 1 is detected by the value of the torque capacity. If the brake switch 167 is off, the load range detector 176 determines load range of the engine. When the accelerator pedal is released and the accelerator switch 162 is off, the torque capacity calculator 180 produces an output signal representing a minimum duty ratio (a minimum percentage (10%) of engine torque at full throttle). Accordingly, torque capacity of the transfer clutch 52 is fixed to ten percent of the engine torque at full throttle. Thus, a small torque is transmitted to the rear wheels of the vehicle at a low vehicle speed, so that the tight braking phenomenon can be prevented with slipping of the transfer clutch.

When the accelerator switch 162 is closed, for example at the D-range, and the throttle position switch 163 is off because of a light load on the engine, the torque capacity calculator 180 produces a signal for twenty percent of the clutch torque transmitted by the clutch 1. Accordingly, the torque capacity of the transfer clutch increases with an increase of engine speed. Further, the torque capacity of the transfer clutch increases with increase of the torque transmitted by the clutch 1. In such a state, the transfer clutch still slips so as to prevent the tight corner braking.

When the throttle position switch 163 is on at a heavy load in the D-range, the calculator 180 produces a signal for 50% of the torque transmitted by the clutch 1. Thus, the torque capacity of the transfer clutch 52 increases.

When the vehicle speed is higher than the speed $V_1$ while the clutch 1 is entirely engaged, the engine torque look-up table 173 provides engine torques dependent on vehicle speeds. In response to the output signal of clutch entire engage detector 175b, the range detector 177 detects whether the drive condition is in the range $D_2$ or $D_3$.

In the range $D_2$, the calculator 180 produces a signal for thirty percent of engine torque. Thus, thirty percent of the engine torque is transmitted to the rear wheels to allow the transfer clutch to slip at sharp curves.

In the range $D_3$, the torque rate is set to fifty percent. In such a case, the engine torque at full throttle is used for obtaining the torque capacity of the transfer clutch. Namely, the torque capacity is fifty percent of the engine torque.

When the brake pedal is depressed to close the brake switch 167, the deceleration calculator 178 calculates deceleration dv/dt based on vehicle speed fed from the vehicle speed sensor 165. When the deceleration is larger than a set value (0.5) which means a sudden braking, a high torque rate (50%) is set by the torque capacity calculator 180, as shown in FIG. 4d. The torque capacity of the transfer clutch is obtained by multiplying the torque rate and the engine torque at that time. After that, even if the deceleration becomes low, the torque rate is held at that value, thereby preventing the auxiliary wheels from being locked.

When deceleration is lower than the set value, a low torque rate (25%) is set, so that the torque capacity of the transfer clutch is lower. Thus, tight corner braking at sharp corners can be prevented. When the accelerator pedal is depressed, the torque capacity is changed to a value dependent on driving conditions.

Figure 5A:
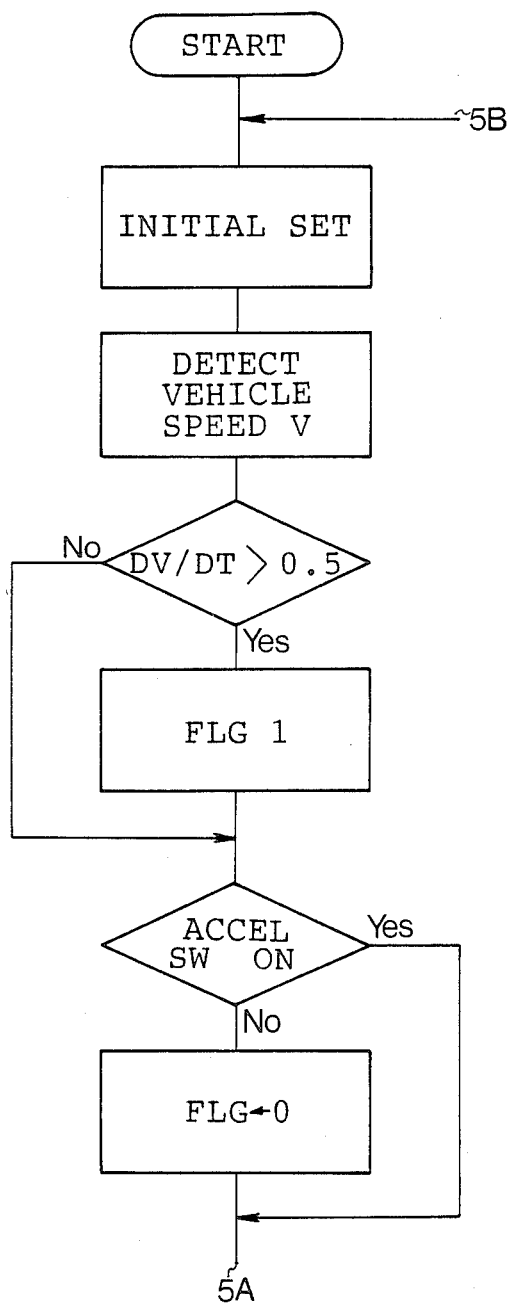
FIGS. 5a and 5b show a flowchart showing the operation of the system.
Figure 5B:
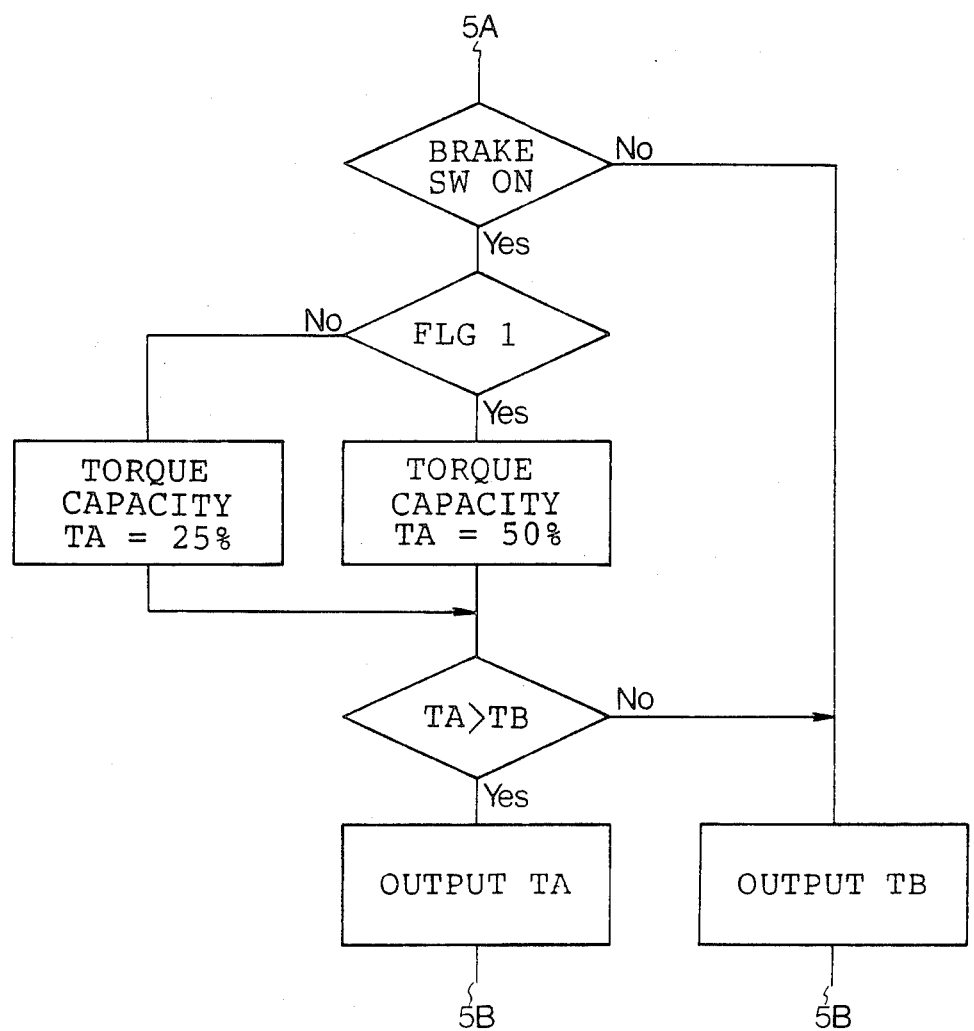

If the accelerator pedal is depressed after the brake pedal has been depressed, torque capacity $T_B$ set by the depression of the brake pedal and torque capacity $T_A$ set by the depression of accelerator pedal are compared with each other, and torque capacity for the transfer clutch is determined to be the larger value. FIGS. 5a and 5b show the above described operation.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for a four-wheel drive vehicle having an engine with a crankshaft, a transmission with an input shaft and an output shaft, a main clutch operatively connected to the crankshaft of the engine and to the input shaft of the transmission for transmitting output of the engine to the transmission, the improvement in the system comprising:
- a variably engageable transfer clutch operatively connected to the output shaft of the transmission and to a power transmitting train for providing a four-wheel drive power train, the transfer clutch having a controllable clutch torque capacity at different engagement degrees of the transfer clutch;
- a vehicle speed sensor for detecting vehicle speed and producing a vehicle speed signal dependent on the vehicle speed;
- means for producing a brake signal at braking of the vehicle;
- first means for providing an engine torque signal, representing engine torque, dependent on an operating condition of the vehicle;
- second means responsive to the vehicle speed signal for producing a deceleration signal dependent on deceleration of the vehicle; and
- control means responsive to the brake signal, the deceleration signal and the engine torque signal for engaging the transfer clutch at different torque capacities which are determined as different predetermined rates of the engine torque in accordance with different values of the deceleration represented by the deceleration signal.

2. The control system according to claim 1 wherein the second means is provided for producing a deceleration signal representing a high deceleration higher than a set value and a low deceleration lower than the set value, respectively.

3. The control system according to claim 1, wherein said means for producing a brake signal is a brake switch.

4. The control system according to claim 1, further comprising
- an accelerator switch for detecting operation of an accelerator of the engine,
- said control means is further responsive to the accelerator switch for changing the torque capacity of the transfer clutch corresponding to the deceleration at the braking when the accelerator is not operated for a predetermined period.

5. The control system according to claim 1, further comprising
- an accelerator switch for detecting operation of an accelerator of the engine,
- said control means is further responsive to the accelerator switch when the accelerator is operated after the braking for providing the torque capacity of the transfer clutch to be the largest value of the torque capacity of the transfer clutch corresponding to the deceleration at the braking and of a torque capacity of the transfer clutch provided by said control means at a predetermined rate of the engine torque corresponding to the operating condition at the time.

6. The control system according to claim 1, wherein said control means is further for maintaining the torque capacity of the transfer clutch corresponding to the deceleration at the braking, when the deceleration is at a value higher than a predetermined rate, even when the deceleration thereafter becomes low.

7. The control system according to claim 1, further comprising
- an accelerator switch for detecting operation of an accelerator of the vehicle,
- said control means is further responsive to the accelerator switch for changing the torque capacity of the transfer clutch corresponding to the deceleration at the braking, when the deceleration is at a rate lower than a predetermined rate, when the accelerator is operated after the braking, to a value of a torque capacity of the transfer clutch provided by said control means at a predetermined rate of the engine torque corresponding to the operating condition at the time.

8. The control system according to claim 5, wherein said first means is for determining the engine torque as a function of vehicle speed as the operating condition in response to said vehicle speed signal.

9. The control system according to claim 8, wherein said first means determines the engine torque from a look-up table.

10. The control system according to claim 5, wherein said first means is for determining the engine torque at full throttle.

11. The control system according to claim 7, wherein said first means is for determining the engine torque as a function of vehicle speed as the operating condition in response to said vehicle speed signal.

12. In a control system for a four-wheel drive vehicle having main drive wheels, auxiliary drive wheels and an engine with a crankshaft, a transmission with an input shaft and an output shaft, a variably engageable main clutch operatively connected to the crankshaft of the engine and to the input shaft of the transmission for transmitting output of the engine to the transmission, the main drive wheels being connected to the output shaft of the transmission, the improvement in the system comprising:
- a variably engageable transfer clutch operatively connected to the output shaft of the transmission and to a power transmitting train for providing a four-wheel drive power train, the transfer clutch having a controllable clutch torque capacity, and the auxiliary drive wheels being connected to the power transmitting train;
- an engine speed sensor for detecting engine speed and for producing an engine speed signal dependent thereon;
- a vehicle speed sensor for detecting vehicle speed and producing a vehicle speed signal dependent on the vehicle speed;
- means for producing a brake signal at braking of the vehicle;
- first means for determining a braking deceleration condition of the vehicle in response to the brake signal and said vehicle speed signal, and for controlling the torque capacity of the transfer clutch in response to the deceleration condition of the vehicle,
- second means responsive to the engine speed signal for detecting a load range and for producing a load range signal, and
- third means for providing the torque capacity of the transfer clutch dependent on the load range signal.

13. The control system according to claim 12, wherein
said first means is for selecting different torque rates providing different torque capacities for the transfer clutch in accordance with different values of said deceleration condition of the vehicle.

14. The control system according to claim 13, wherein one of the different torque rates is substantially 25% when the value of the deceleration condition determined by said first means is lower than a set value, so as to prevent the auxiliary drive wheels from being locked.

15. The control system according to claim 14, wherein another of the different torque rates is substantially 50% when the value of the deceleration condition determined by said first means is higher than the set value, representing a sudden braking condition.

16. The control system according to claim 12, further comprising detecting means for detecting an engaging condition of the main clutch in response to the vehicle speed signal and for producing an entire enagement signal when the vehicle speed signal reaches a predetermined value.

17. The control system according to claim 12, wherein said means for producing a brake signal is a brake switch.

* * * * *